(12) United States Patent
Okamoto et al.

(10) Patent No.: US 10,865,855 B2
(45) Date of Patent: Dec. 15, 2020

(54) VARIABLE-SPEED SPEED-UP GEAR

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 116 days.

(21) Appl. No.: 16/314,823

(22) PCT Filed: Aug. 29, 2016

(86) PCT No.: PCT/JP2016/075150
§ 371 (c)(1),
(2) Date: Jan. 2, 2019

(87) PCT Pub. No.: WO2018/042485
PCT Pub. Date: Mar. 8, 2018

(65) Prior Publication Data
US 2020/0256432 A1 Aug. 13, 2020

(51) Int. Cl.
*F16H 3/72* (2006.01)
*H02K 7/02* (2006.01)
*H02K 7/116* (2006.01)

(52) U.S. Cl.
CPC ............... *F16H 3/725* (2013.01); *H02K 7/02* (2013.01); *H02K 7/116* (2013.01)

(58) Field of Classification Search
CPC .......... F16H 3/725; H02K 7/02; H02K 7/116
See application file for complete search history.

(56) References Cited

U.S. PATENT DOCUMENTS

| 2005/0113201 A1 | 5/2005 | Kimura et al. |
| 2017/0141706 A1* | 5/2017 | Kobayashi ............. H02K 16/00 |
| 2017/0155345 A1 | 6/2017 | Kobayashi et al. |

FOREIGN PATENT DOCUMENTS

| JP | S61 074941 A | 4/1986 |
| JP | S62 115521 U | 7/1987 |

(Continued)

OTHER PUBLICATIONS

International Search Report in corresponding International Application No. PCT/JP2016/075150, dated Nov. 22, 2016 (4 pages).

(Continued)

*Primary Examiner* — Derek D Knight
(74) *Attorney, Agent, or Firm* — Osha Bergman Watanabe & Burton LLP

(57) ABSTRACT

The present invention provides a variable-speed speed-up gear including an electric driving device (50) that generates a rotational driving force, and a planetary gear transmission device (10) that changes the speed of the rotational driving force generated by the electric driving device (50) and transmit the changed rotation driving force to a driving target, wherein a sun gear shaft (12) forms an output shaft (Ao) connected to the driving target, an internal gear carrier shaft (37) configures a constant-speed input shaft (Ac), and a planetary gear carrier shaft (27) configures a variable-speed input shaft (Av), the electric driving device (50) includes a constant-speed motor (51) having a constant-speed rotor (52) which is configured to rotate a constant-speed input shaft of the transmission device, and a variable-speed motor (71) having a variable-speed rotor (72) which is configured to rotate the variable-speed input shaft of the transmission device, the variable-speed rotor (72) and the planetary gear carrier shaft (27) have a shaft insertion hole (74) which is formed in a cylindrical shape around the axis and passes therethrough in the axial direction, and the constant-speed rotor (52) is inserted through the shaft insertion hole (74) and has an inertia body (3) which is configured to rotate in conjunction with the output shaft (Ao).

3 Claims, 6 Drawing Sheets

(56) References Cited

FOREIGN PATENT DOCUMENTS

| | | |
|---|---|---|
| JP | 2001 140769 A | 5/2001 |
| JP | 2004 150609 A | 5/2004 |
| JP | 4472350 B2 | 6/2010 |
| JP | 2010 242811 A | 10/2010 |
| WO | 2016 010146 A1 | 1/2016 |

OTHER PUBLICATIONS

Written Opinon in corresponding International Application No. PCT/JP2016/075150, dated Nov. 22, 2016 (10 pages).

\* cited by examiner

VARIABLE-SPEED SPEED-UP GEAR

FIELD OF THE INVENTION

The present invention relates to a variable-speed speed-up gear which includes an electric driving device including a constant-speed motor and a variable-speed motor, and a planetary gear transmission device for changing the speed of a rotational driving force generated by the electric driving device and then transmitting the speed-changed rotational driving force to a driving target.

BACKGROUND ART

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses that a constant-speed motor and a variable-speed motor for speed change are used as the electric driving device and a planetary gear transmission device is used as the transmission device to accurately control a gear ratio. In this apparatus, it is possible to change a rotation rate of an output shaft of the planetary gear transmission device connected to the rotary machine by changing a rotation rate of the variable-speed motor.

CITATION LIST

Patent Literature

[Patent Document 1]
  Japanese Patent No. 4472350

SUMMARY OF INVENTION

Technical Problem

In the above-described variable-speed speed-up gear, for example, electric power supply to the electric motor may be cut off due to an overvoltage, overcurrent, or the like. In such a case, both the constant-speed motor and the variable-speed motor are stopped. At this time, the variable-speed motor connected to the constant-speed motor via the transmission device may over-rotate due to the rotation rate of the constant-speed motor or the inertia of the compressor.

The present invention relates to a variable-speed speed-up gear which includes an electric driving device including a constant-speed motor and a variable-speed motor, and a planetary gear transmission device for changing the speed of a rotational driving force generated by the electric driving device and then transmitting the speed-changed rotational driving force to a driving target, and it is an object of the present invention to provide a variable-speed speed-up gear capable of stopping the variable-speed motor without over-rotation.

Solution to Problem

According to a first aspect of the present invention, there is provided a variable-speed speed-up gear including an electric driving device that generates a rotational driving force, and a transmission device that changes the speed of the rotational driving force generated by the electric driving device and transmits the changed rotation driving force to a driving target, wherein the transmission device includes a sun gear that rotates about an axis, a sun gear shaft which is fixed to the sun gear and extends in an axial direction around the axis, a planetary gear that meshes with the sun gear, revolve around the axis and rotate about its own center line, an internal gear which has a plurality of teeth aligned annularly around the axis and meshes with the planetary gear, a planetary gear carrier which has a planetary gear carrier shaft extending in the axial direction around the axis and supports the planetary gear to revolve around the axis and to be rotatable around a center line of the planetary gear itself, and an internal gear carrier which has an internal gear carrier shaft extending in the axial direction around the axis and supports the internal gear to be rotatable about the axis, the sun gear shaft configures an output shaft connected to the driving target, the internal gear carrier shaft configures a constant-speed input shaft, and the planetary gear carrier shaft configures a variable-speed input shaft, the electric driving device includes a constant-speed motor having a constant-speed rotor that rotates the constant-speed input shaft of the transmission device, and a variable-speed motor having a variable-speed rotor that rotates the variable-speed input shaft of the transmission device, the variable-speed rotor and the planetary gear carrier shaft have a shaft insertion hole which is formed in a cylindrical shape around the axis and passes therethrough in the axial direction, and the constant-speed rotor is inserted through the shaft insertion hole and has an inertia body which is configured to rotate in conjunction with the output shaft.

According to such a configuration, when the variable-speed motor and the constant-speed motor trip and the output shaft which is in a free running state decelerates, a change in a rotation rate of the output shaft becomes gentle due to the inertia body added to the output shaft, and a time until the output shaft stops becomes longer. Therefore, it is possible to prevent the output shaft from rapid deceleration, and thus it becomes possible to prevent over-rotation of the variable speed electric motor connected to the output shaft (driving target) via the transmission device which is the planetary gear transmission device.

In the variable-speed speed-up gear, the inertial body may be installed on the output shaft and may have a bearing disposed on both axial sides of the inertia body and in the vicinity of the inertia body.

According to such a configuration, it is possible to stably support the output shaft on which the inertia body which is a heavy object is installed.

Advantageous Effects of Invention

According to the present invention, when the variable-speed motor and the constant-speed motor trip and the output shaft which is in a free running state decelerates, a change in a rotation rate of the output shaft becomes gentle due to the inertia body added to the output shaft, and a time until the output shaft stops becomes longer. Therefore, it is possible to prevent the output shaft from rapid deceleration, and thus it becomes possible to prevent over-rotation of the variable speed electric motor connected to the output shaft (driving target) via the transmission device which is the planetary gear transmission device.

DESCRIPTION OF EMBODIMENTS

Hereinafter, a variable-speed speed-up gear according to an embodiment of the present invention will be described in detail with reference to the drawings.

Figure 1:
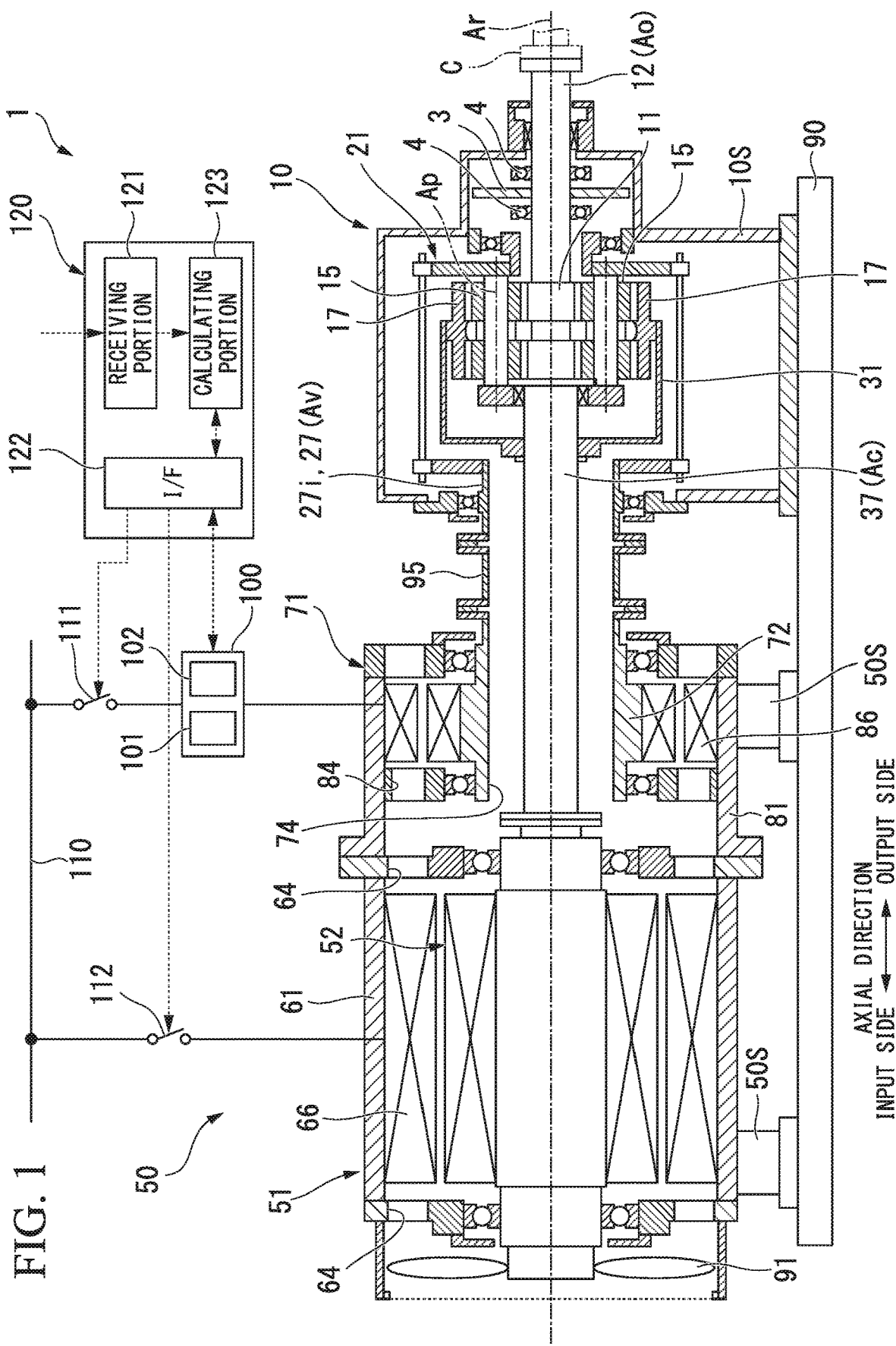
FIG. 1 is a cross-sectional view of a variable-speed speed-up gear according to an embodiment of the present invention.

As shown in FIG. 1, the variable-speed speed-up gear 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable-speed speed-up gear 1 can be applied to, for example, a fluid mechanical system such as a compressor system.

The driving target of the variable-speed speed-up gear 1 of the embodiment is a compressor C.

The transmission device 10 is a planetary gear transmission device.

The electric driving device 50 includes a constant-speed motor 51 having a constant-speed rotor 52 which rotates at a constant speed, and a variable-speed motor 71 having a variable-speed rotor 72 which rotates at an arbitrary rotation rate. Each of the constant-speed rotor 52 and the variable-speed rotor 72 is connected to the transmission device 10.

In the variable-speed speed-up gear 1 of the embodiment, a flywheel 3 (flywheel) which is an inertial body rotating in conjunction with an output shaft Ao of the transmission device 10 is installed. That is, in the variable-speed speed-up gear 1 of the embodiment, the moment of inertia of the output shaft Ao is increased. Thus, for example, in a case in which the constant-speed rotor 52, the variable-speed rotor 72, and the output shaft Ao are in a free running state (continuously rotating with momentum), a change in a rotation rate of the output shaft Ao becomes gentle, and a time until the output shaft Ao stops becomes longer.

The electric driving device 50 is supported on a frame 90 via an electric driving device support portion 50S. The transmission device 10 is supported on the frame 90 via a transmission device support portion 10S. The electric driving device 50 and the transmission device 10 which are heavy objects can be securely fixed by these support portions.

Figure 2:
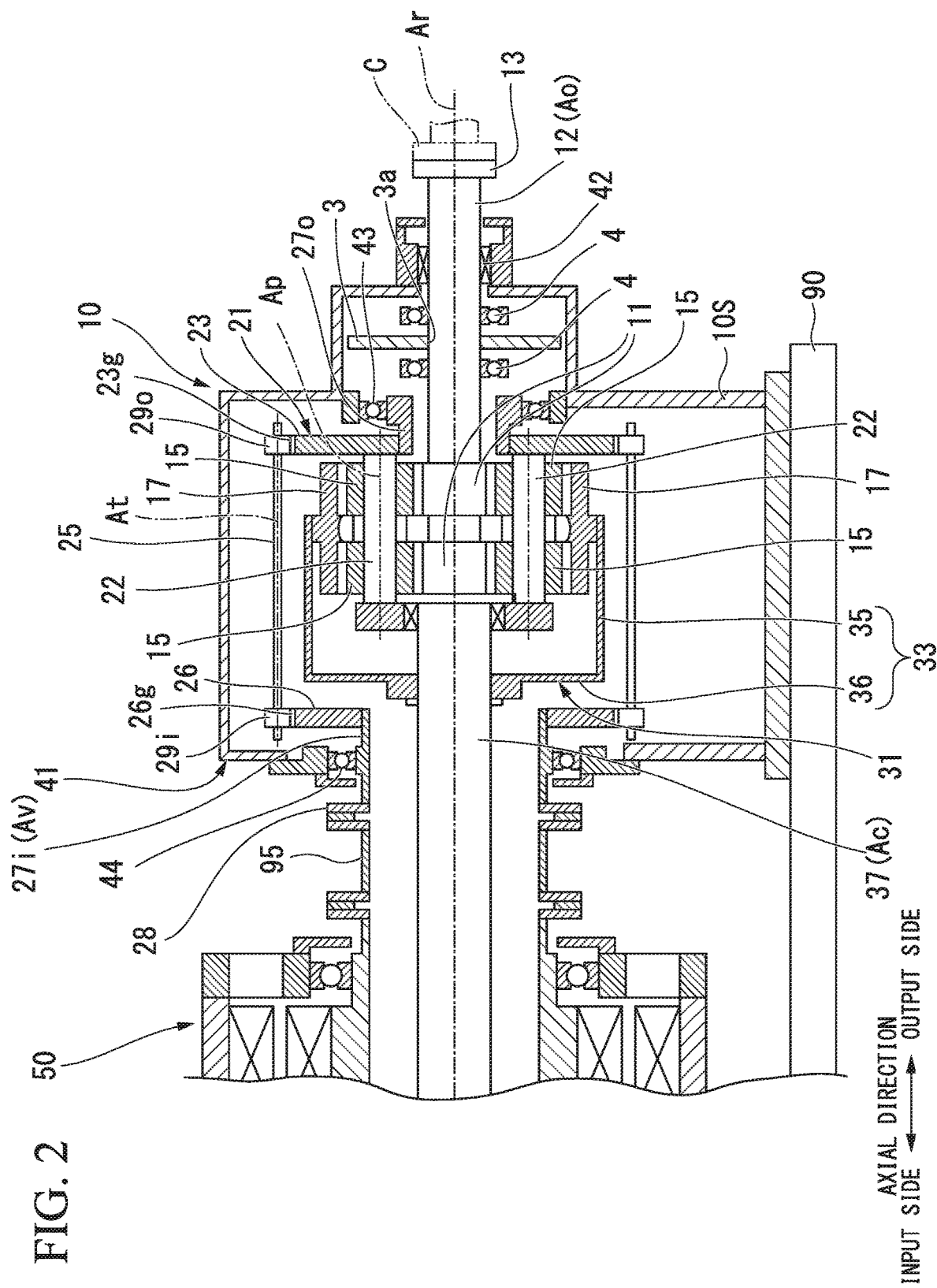
FIG. 2 is a cross-sectional view of a transmission device according to the embodiment of the present invention.

As shown in FIG. 2, the transmission device 10 includes a sun gear 11 which rotates about an axis Ar extending in a horizontal direction, a sun gear shaft 12 fixed to the sun gear 11, a plurality of planetary gears 15 which mesh with the sun gear 11, revolve around the axis Ar and rotate about their own center lines Ap, an internal gear 17 in which a plurality of teeth are arranged in an annular shape around the axis Ar and which meshes with the plurality of planetary gears 15, a planetary gear carrier 21 which supports the plurality of planetary gears 15 to allow the plurality of planetary gears 15 to revolve around the axis Ar and to rotate about their own center lines Ap, an internal gear carrier 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction. In the variable-speed speed-up gear 1 of the embodiment, the electric driving device 50 is disposed on the input side in the axial direction, and the transmission device 10 is disposed on the output side of the electric driving device 50. The compressor C is disposed on the output side of the variable-speed speed-up gear 1.

The sun gear shaft 12 has a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed on the transmission casing 41.

The planetary gear carrier 21 includes a planetary gear shaft 22 provided for each of the plurality of planetary gears 15, a carrier main body 23 which fixes the relative positions of the plurality of planetary gear shafts 22, and an output-side planetary gear carrier shaft 27o which extends in the axial direction centered on the axis Ar. The output-side planetary gear carrier shaft 27o is fixed to an inner side of the carrier main body 23 in the radial direction.

The planetary gear shaft 22 passes through the center lines Ap of the planetary gears 15 in the axial direction and supports the planetary gears 15 to allow the planetary gears 15 to rotate about a center line thereof. The carrier main body 23 extends outward in the radial direction from the plurality of planetary gear shafts 22.

The output-side planetary gear carrier shaft 27o extends from the carrier main body 23 toward the output side. The output-side planetary gear carrier shaft 27o is formed in a cylindrical shape centered on the axis Ar.

The output-side planetary gear carrier shaft 27o is supported to be rotatable about the axis Ar by a planetary gear carrier bearing 43. The planetary gear carrier bearing 43 is installed on the transmission casing 41. The sun gear shaft 12 is inserted through the inner circumferential side of the output-side planetary gear carrier shaft 27o.

The transmission device 10 includes an input-side planetary gear carrier shaft 27i which is connected to the variable-speed rotor 72 of the variable-speed motor 71, and a transmitting shaft 25 which transmits rotation of the input-side planetary gear carrier shaft 27i to the planetary gear carrier 21.

The input-side planetary gear carrier shaft 27i is formed in a cylindrical shape centered on the axis Ar. The input-side planetary gear carrier shaft 27i is disposed on the input side of the transmission device 10 and is supported by the planetary gear carrier bearing 44 to be rotatable about the axis Ar. The planetary gear carrier bearing 44 is installed on the transmission casing 41. An internal gear carrier shaft 37 for driving the internal gear carrier 31 of the transmission device 10 is inserted through the inner circumferential side of the input-side planetary gear carrier shaft 27i.

An annular flange 28 which expands outward in the radial direction is formed at an input-side end of the input-side planetary gear carrier shaft 27*i*. An input-side arm portion 26 which extends outward in the radial direction is formed on the output-side end of the input-side planetary gear carrier shaft 27*i*.

The transmitting shaft 25 is supported to be rotatable about the axis At. The transmitting shaft 25 is installed on the transmission casing 41 via a bearing (not shown). An input-side transmitting gear 29*i* and an output-side transmitting gear 29*o* are fixed to both ends of the transmitting shaft 25.

The input-side transmitting gear 29*i* meshes with a driving gear 26*g* formed on the outer circumference of the input-side arm portion 26. The output-side transmitting gear 29*o* meshes with a gear 23*g* formed on the outer circumference of the carrier main body 23. Accordingly, the rotation of the input-side planetary gear carrier shaft 27*i* is transmitted to the planetary gear carrier 21 via the transmitting shaft 25.

The internal gear carrier 31 includes a carrier main body 33 to which the internal gear 17 is fixed, and the internal gear carrier shaft 37 which is fixed to the carrier main body 33 and extends in the axial direction centered on the axis Ar.

The carrier main body 33 includes a cylindrical portion 35 which has a cylindrical shape centered on the axis Ar and has the internal gear 17 fixed to the inner circumferential side thereof, and an input-side arm portion 36 which extends from an input-side end of the cylindrical portion 35 inward in the radial direction.

The internal gear carrier shaft 37 having a column shape around the axis Ar is disposed on the input side of the sun gear shaft 12 having a column shape around the axis Ar. The input-side arm portion 36 of the carrier main body 33 is fixed to the internal gear carrier shaft 37. The internal gear carrier shaft 37 is inserted through the inner circumferential side of the cylindrical input-side planetary gear carrier shaft 27*i*. A flange 37*i* which protrudes outward in the radial direction is formed at an input-side end of the internal gear carrier shaft 37.

Figure 3:
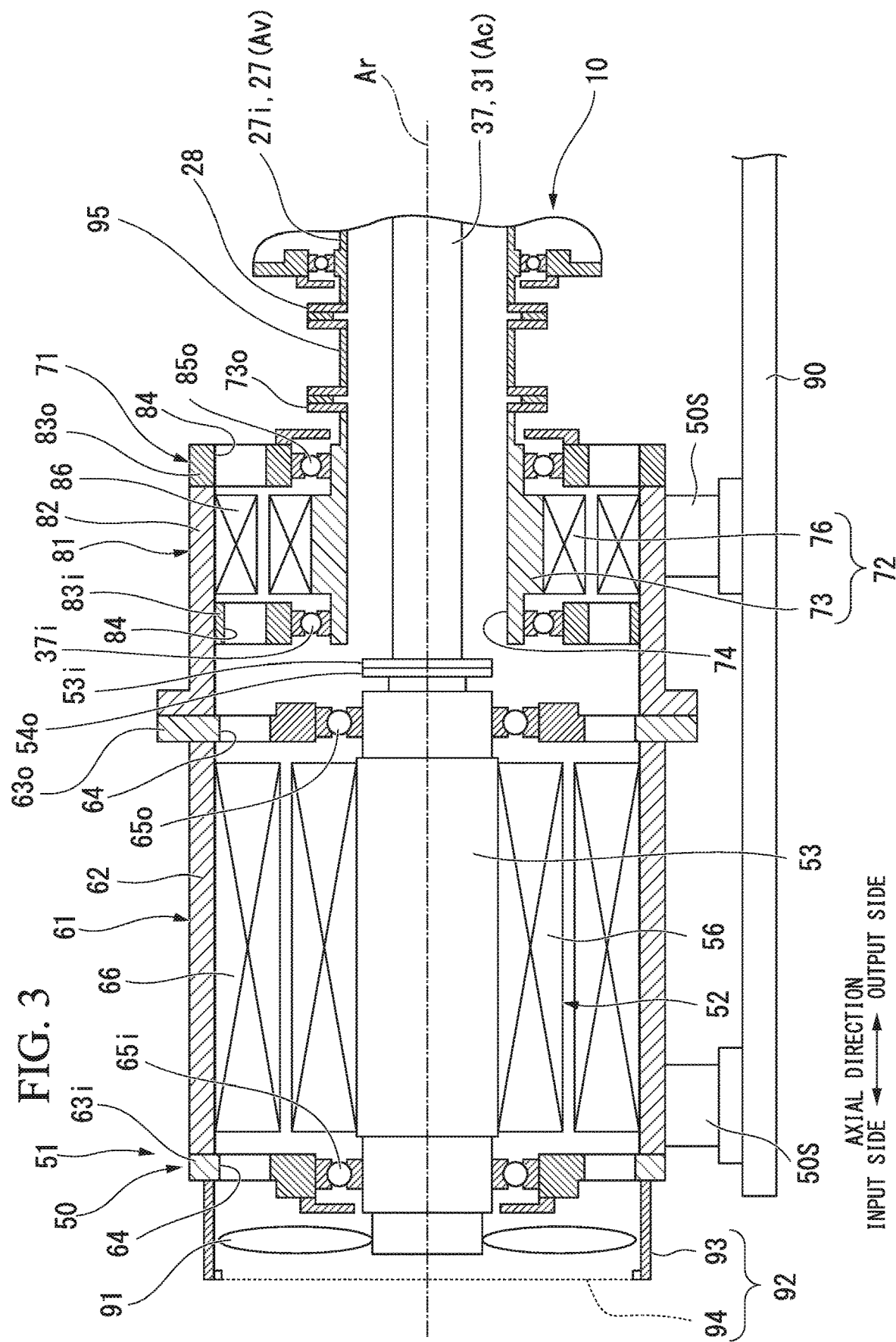
FIG. 3 is a cross-sectional view of an electric driving device according to the embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27*i* of the transmission device 10. The electric driving device 50 has a cooling fan 91 which cools the constant-speed motor 51 and a fan cover 92 which covers the cooling fan 91.

The internal gear carrier shaft 37 is a constant-speed input shaft Ac which rotates at a constant speed under a driving force of the constant-speed motor 51. The input-side planetary gear carrier shaft 27*i* is a variable speed input shaft Av which rotates at an arbitrary rotation rate under a driving force of the variable-speed motor 71.

The variable-speed speed-up gear 1 can change the rotation rate of an output shaft Ao of the transmission device 10 connected to the driving target by changing the rotation rate of the variable-speed motor 71.

In the embodiment, the constant-speed motor 51 is, for example, a four-pole three-phase induction motor. Further, the variable-speed motor 71 is an eight-pole three-phase induction motor having more poles than the constant-speed motor 51. The specifications of the constant-speed motor 51 and the variable-speed motor 71 are not limited to these and can be appropriately changed.

The constant-speed motor 51 includes a constant-speed rotor 52 which rotates about the axis Ar and is connected through a constant-speed clutch 57 to the internal gear carrier shaft 37 which is the constant-speed input shaft Ac of the transmission device 10, a constant-speed stator 66 disposed on the outer circumferential side of the constant-speed rotor 52, and a constant-speed motor casing 61 in which the constant-speed stator 66 is fixed to the inner circumferential side thereof.

The constant-speed rotor 52 includes a constant-speed rotor shaft 53 which has a column shape around the axis Ar, and a conductive body 56 fixed to the outer circumference of the constant-speed rotor shaft 53. A flange 53*o* which protrudes outward in the radial direction is formed at an output-side end portion of the constant-speed rotor shaft 53. The constant-speed rotor shaft 53 and the internal gear carrier shaft 37 are integrated by connecting the flange 53*o* with the flange 37*i* with bolts or the like.

The cooling fan 91 is fixed to the input side end of the constant-speed rotor shaft 53.

The constant-speed stator 66 is disposed radially outward from the conductive body 56 of the constant-speed rotor 52. This constant-speed stator 66 is formed of a plurality of coils.

The constant-speed motor casing 61 includes a casing main body 62 having a cylindrical shape centered on the axis Ar and in which the constant-speed stator 66 is fixed to the inner circumferential side thereof, and covers 63*i* and 63*o* which close both axial ends of the cylindrical casing main body 62. Constant-speed rotor bearings 65*i* and 65*o* are installed on the respective covers 63*i* and 63*o* to rotatably support the constant-speed rotor shaft 53 about the axis Ar. A plurality of openings 64 axially passing through the respective covers 63*i* and 63*o* at positions radially outward from the constant-speed rotor bearing 65*i* are formed in the respective covers 63*i* and 63*o*.

The input-side end of the constant-speed rotor shaft 53 protrudes toward the input side from the input-side cover 63*i* of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes a cylindrical cover main body 93 disposed on the outer circumferential side of the cooling fan 91, and an air circulating plate 94 installed at an opening of the cover main body 93 on the inlet side and having a plurality of air holes formed therein. The fan cover 92 is fixed to the cover 63*i* of the constant-speed motor casing 61 on the input side.

The variable-speed motor 71 includes a variable-speed rotor 72 which rotates about the axis Ar and is connected to the input-side planetary gear carrier shaft 27*i* which is the variable-speed input shaft Av, a variable-speed stator 86 disposed on the outer circumferential side of the variable-speed rotor 72, and a variable-speed motor casing 81 in which the variable-speed stator 86 is fixed to the inner circumferential side thereof.

The variable-speed rotor 72 has a variable-speed rotor shaft 73 and a conductive body 76 fixed to the outer circumference of the variable-speed rotor shaft 73. The variable-speed rotor shaft 73 has a cylindrical shape around the axis Ar and has a shaft insertion hole 74 passing through the variable-speed rotor shaft 73 in the axial direction. The internal gear carrier shaft 37 as the constant-speed input shaft Ac is inserted through the shaft insertion hole 74 of the variable-speed rotor shaft 73. An annular flange 73*o* expanding radially outward is formed at the output-side end of the variable-speed rotor shaft 73.

The variable-speed stator 86 is disposed radially outward from the conductive body 76 of the variable-speed rotor 72. The variable-speed stator 86 is formed of a plurality of coils.

The variable-speed motor casing 81 includes a casing main body 82 having a cylindrical shape around the axis Ar and to the inner circumferential side of which the variable-speed stator 86 is fixed, an output-side cover 83o which closes the output-side end of the cylindrical casing main body 82, and an inlet-side cover 83i disposed on the input side of the variable-speed stator 86 and fixed to the inner circumferential side of the cylindrical casing main body 82. Variable-speed rotor bearings 85i and 85o which rotatably support the variable-speed rotor shaft 73 about the axis Ar are installed on the respective covers 83i and 83o. In the respective covers 83i and 83o, a plurality of openings 84 passing through the respective covers 83i and 83o in the axial direction are formed at positions radially outward from the variable-speed rotor bearings 85i and 85o.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

The variable-speed speed-up gear 1 of the embodiment includes a variable-speed flexible coupling 95 which is disposed between the input-side planetary gear carrier shaft 27i which is the variable-speed input shaft Av and the variable-speed rotor 72 and connects them.

Further, in the variable-speed speed-up gear 1 of the embodiment, the constant-speed rotor 52, the variable-speed rotor 72 and the sun gear shaft 12 are arranged on the same axis.

A disc-shaped flywheel 3 is fixed to the sun gear shaft 12 which is the output shaft Ao of the embodiment. The flywheel 3 is disposed on the output shaft Ao between the sun gear 11 and the sun gear bearing 42. The flywheel 3 is disposed inside the transmission casing 41.

The flywheel 3 is fixed to be integrated with the output shaft Ao. A through-hole 3a is formed in the flywheel 3, and the output shaft Ao is inserted through the through-hole 3a. The flywheel 3 can be fixed to the output shaft Ao via, for example, a flange (not shown) formed at an end of the flywheel 3 on the inner side in the radial direction. A key groove may be formed in both the flywheel 3 and the output shaft Ao, and the flywheel 3 and the output shaft Ao may be fixed using a key. The flywheel 3 and the output shaft Ao may be joined by welding or the like.

Further, the flywheel 3 and the output shaft Ao may be integrally molded.

Bearings 4 are disposed on both sides of the flywheel 3 in the axial direction and in the vicinity of the flywheel 3. The bearings 4 are fixed to the transmission casing 41. As the bearing 4, for example, a rolling bearing (ball bearing) can be adopted. When an axial distance between the flywheel 3 and the sun gear bearing 42 is sufficiently small, the output-side bearing 4 of the pair of bearings 4 can be omitted.

The flywheel 3 is formed of iron. A material for forming the flywheel 3 is not limited to iron, but a metal having high density is preferable. Further, it is formed so that there is no mass distribution in the circumferential direction of the flywheel 3.

It is preferable that a thickness of the flywheel 3 in the axial direction be small. It is preferable that a diameter of the flywheel 3 be large within a range which fits within the transmission casing 41 and the thickness thereof be reduced.

For example, the diameter of the flywheel 3 is sufficiently larger than a diameter of the flange 13 of the sun gear shaft 12.

The specification of the flywheel 3 can be determined by simulation.

Figure 4:
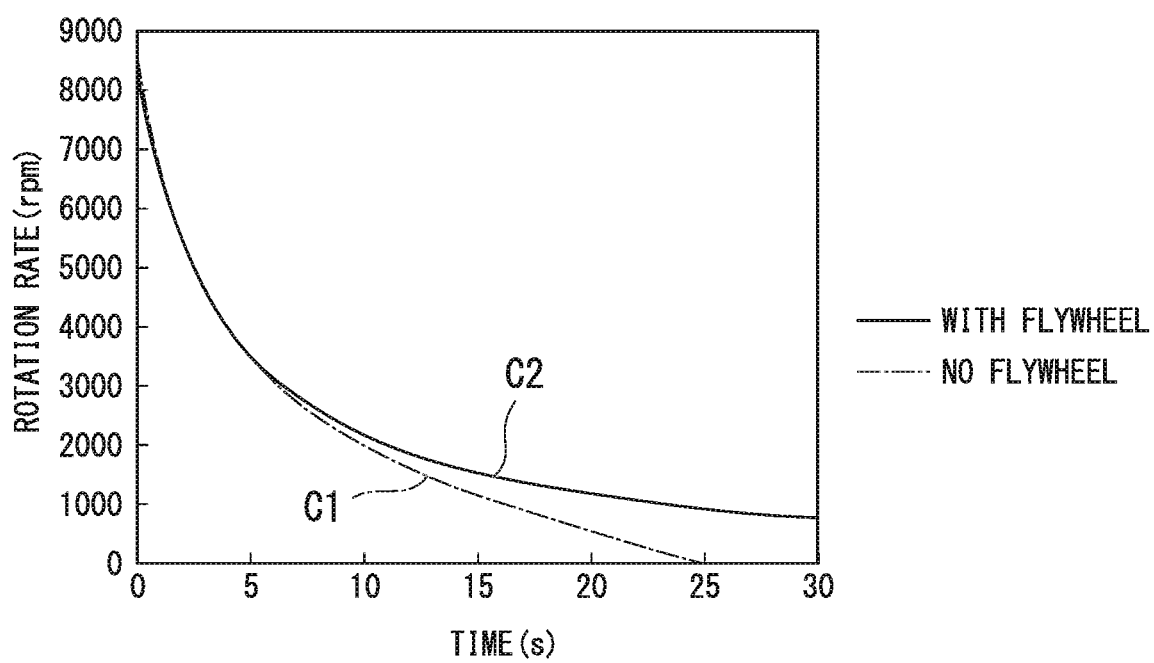
FIG. 4 is a graph showing a deceleration curve of an output shaft used for designing a flywheel according to the embodiment of the present invention.

In a design of the flywheel 3, as shown in FIG. 4, a deceleration curve C1 of the output shaft Ao on which the flywheel 3 is not installed and a deceleration curve C2 of the output shaft Ao not to over-rotate the variable-speed motor 71 are obtained by simulation using a torque curve of the compressor C or the like.

Next, the moment of inertia of the output shaft Ao which coincides with the deceleration curve C2 obtained by the simulation is calculated, and a shape of the flywheel 3 which will be installed on the output shaft Ao is determined.

For example, the output shaft Ao without the flywheel 3 stops in 25 seconds from the free running state, but the output shaft Ao with the flywheel 3 does not stop even after 60 seconds from the free running state.

The moment of inertia (cross-sectional secondary moment) of the constant-speed rotor 52 of the constant-speed motor 51 of the embodiment is 500 kg·m$^2$, the moment of inertia of the output shaft Ao on which the flywheel 3 is not installed is 3 kg·m$^2$, and the moment of inertia of the output shaft Ao on which the flywheel 3 is installed is 8 kg·m$^2$. That is, the moment of inertia of the constant-speed rotor 52 is about 100 times the moment of inertia of the output shaft Ao, and the flywheel 3 is added so that the moment of inertia of the output shaft Ao side is about 1.5 times.

Figure 5:
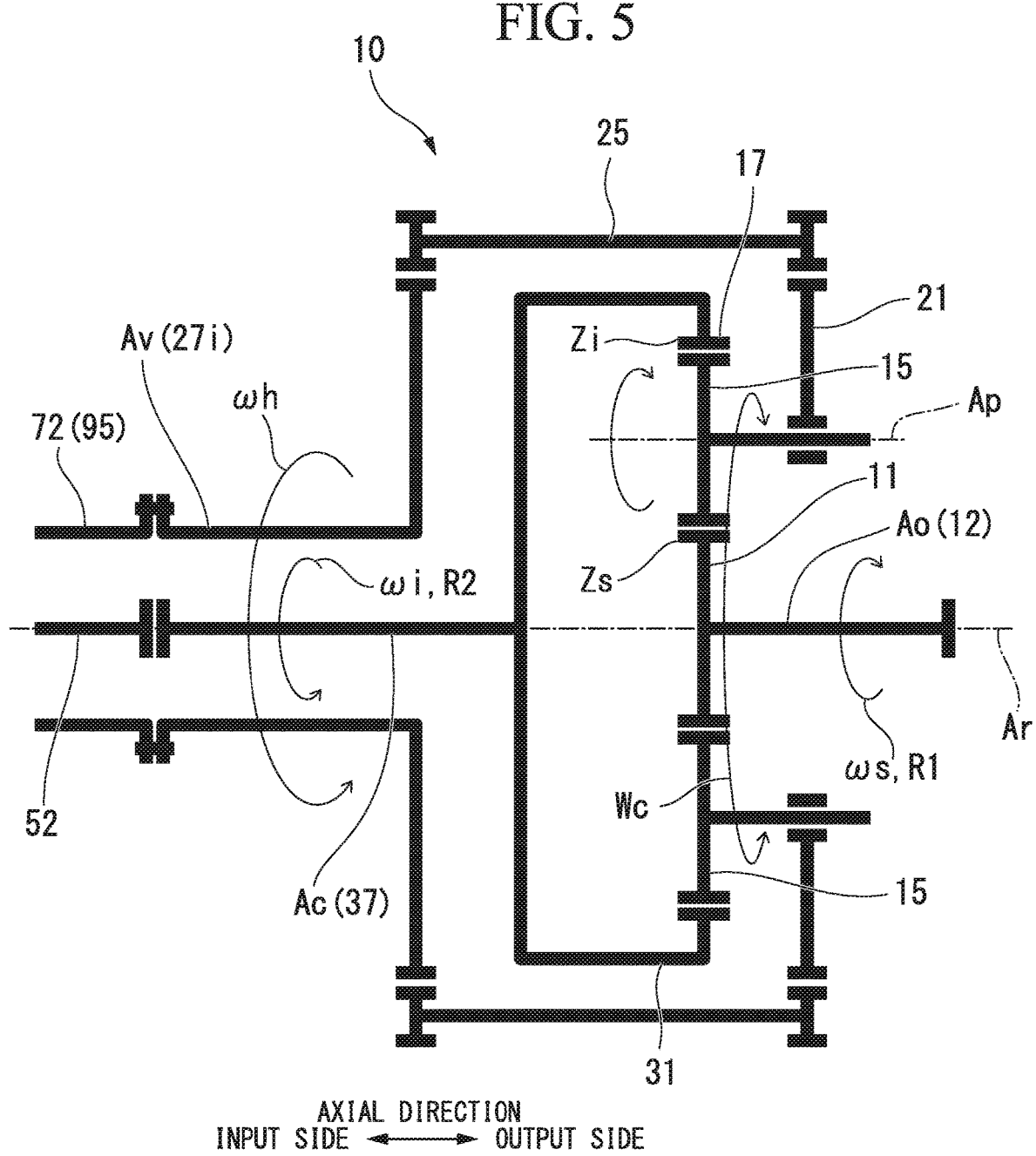
FIG. 5 is a schematic diagram showing a configuration of a transmission device according to the embodiment of the present invention.

As shown in FIG. 5, the constant-speed motor 51 is set to rotate the constant-speed rotor 52 (internal gear 17) in the second direction R2 in the circumferential direction of the axis Ar by supplying the electric power to the constant-speed motor 51. As the constant-speed rotor 52 rotates in the second direction R2, the internal gear carrier shaft 37 and the internal gear carrier 31 rotate in the second direction R2.

The output shaft Ao of the transmission device 10 is set to rotate in the first direction R1 opposite to the second direction R2 by the constant-speed rotor 52 of the constant-speed motor 51 rotating at the maximum rotation rate in the second direction R2. That is, the forward rotation of the constant-speed motor 51 is the second direction R2, and the forward rotation of the output shaft Ao of the transmission device 10 is the first direction R1. The compressor C operates normally as the output shaft Ao rotates forward.

In the following description, the rotation direction of the first direction R1 is referred to as a positive rotation direction, and the rotation direction of the second direction R2 is referred to as a negative rotation direction. For example, the maximum rotation rate of the constant-speed motor 51 is −1800 rpm.

In the transmission device 10, the planetary gear carrier 21 is configured to rotate in the first direction R1 by the variable-speed rotor 72 rotating in the first direction R1.

The variable-speed motor 71 can rotate the variable-speed rotor 72 (the planetary gear carrier 21) in the first direction R1 and the second direction R2 in the circumferential direction of the axis Ar. That is, the variable-speed motor 71 can rotate forward and in reverse. The rotation rate of the output shaft Ao of the transmission device 10 in the first direction R1 is increased by increasing the rotation rate of the variable-speed rotor 72 in the first direction R1. The output shaft Ao rotates at the maximum rotation rate by rotating the variable-speed rotor 72 at the maximum rotation rate in the first direction R1.

The variable-speed motor 71 serves as a generator by rotating the variable-speed rotor 72 by an external force. A state in which the variable-speed motor 71 serves as a generator is referred to as a generator mode.

The variable-speed motor 71 serves as an electric motor by supplying the electric power. A state in which the variable-speed motor 71 serves as an electric motor is referred to as an electric motor mode.

The variable-speed speed-up gear 1 of the embodiment includes a rotation rate controller 100 (inverter) which controls the rotation rate of the variable-speed motor 71, a variable-speed motor switch 111 which sets the variable-speed motor 71 to be in a power supply state and a power cutoff state, a constant-speed motor switch 112 which sets the constant-speed motor 51 to be in the power supply state and the power cutoff state, and a controller 120 which controls operations of the rotation rate controller 100, the variable-speed motor switch 111 and the constant-speed motor switch 112.

The controller 120 is configured of a computer. The controller 120 includes a receiving portion 121 which directly receives an instruction from an operator or receives an instruction from a host control device, an interface 122 which provides instructions to the variable-speed motor switch 111, the rotation rate controller 100 and the constant-speed motor switch 112, and a calculating portion 123 which creates an instruction value $\omega h'$ (frequency) for the variable-speed motor switch 111, the constant-speed motor switch 112, and the rotation rate controller 100 according to the instructions received by the receiving portion 121 or the like.

The variable-speed motor switch 111 is electrically connected to a power source line 110 and the rotation rate controller 100. The rotation rate controller 100 is electrically connected to the variable-speed motor 71. The constant-speed motor switch 112 is electrically connected to the power source line 110 and the constant-speed motor 51.

The variable-speed motor switch 111 is turned on by an ON instruction from the controller 120 and turned off by an OFF instruction from the controller 120. When the variable-speed motor switch 111 is turned on, electric power from the power source line 110 is supplied to the variable-speed motor 71 through the rotation rate controller 100, and the variable-speed motor 71 is in the power supply state. When the variable-speed motor switch 111 is turned off, the power supply from the power source line 110 to the rotation rate controller 100 and the variable-speed motor 71 is cut off, and the variable-speed motor 71 is in the power cutoff state.

The constant-speed motor switch 112 is turned on by an ON instruction from the controller 120 and turned off by an OFF instruction from the controller 120. When the constant-speed motor switch 112 is turned on, the electric power from the power source line 110 is supplied to the constant-speed motor 51, and the constant-speed motor 51 is in the power supply state. When the constant-speed motor switch 112 is turned off, the power supply from the power source line 110 to the constant-speed motor 51 is cut off, and the constant-speed motor 51 is in the power cutoff state.

The rotation rate controller 100 includes a frequency conversion portion 101 which changes a frequency of the electric power supplied from the power source line 110, and a rotation direction switching portion 102 which changes a rotation direction of the variable-speed motor 71.

The frequency conversion portion 101 supplies the electric power having a frequency corresponding to an instruction value $\omega h'$ of the rotation rate of the variable-speed motor 71 instructed by the controller 120 to the variable-speed motor 71. The variable-speed rotor 72 of the variable-speed motor 71 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the sun gear shaft 12 which is the output shaft Ao of the transmission device 10 also changes.

The rotation direction switching portion 102 is a device which changes the rotation direction of the variable-speed motor 71 by using a circuit for switching a plurality of (three in the case of the embodiment) power source lines connected to the variable-speed motor 71. That is, the rotation direction switching portion 102 can rotate the variable-speed rotor 72 forward and in reverse.

Here, the relationship between the number of teeth of each gear of the transmission device 10 and the rotation rate of each shaft of the transmission device 10 will be described with reference to FIG. 5.

The rotation rate of the sun gear shaft 12 as the output shaft Ao is indicated by $\omega S$, the rotation rate of the internal gear carrier shaft 37 (constant-speed motor 51) that is the constant-speed input shaft Ac is indicated by $\omega i$, and the rotation rate of the input-side planetary gear carrier shaft 27$i$ (variable-speed motor 71) that is the variable-speed input shaft Av is indicated by $\omega h$. Further, the number of teeth of the sun gear 11 is indicated by ZS, and the number of teeth of the internal gear 17 is indicated by Zi.

Also, a ratio $\omega S/\omega i$ of the rotation rate $\omega S$ of the output shaft Ao to the rotation rate $\omega i$ of the constant-speed motor 51 is indicated by U. The ratio U of the rotation rate $\omega S$ of the output shaft Ao to the rotation rate $\omega i$ of the constant-speed motor 51 is the same as a ratio Zi/ZS of the number of teeth Zi of the internal gear 17 to the number of teeth ZS of the sun gear 11.

Also, a ratio $\omega c/\omega h$ of the rotation rate we of the planetary gear carrier 21 to the rotation rate $\omega h$ of the variable-speed motor 71 is indicated by P.

The relationship between the number of teeth of each gear and the rotation rate of each shaft in the transmission device 10 can be expressed by the following Formula (1):

$$\omega S/\omega i = P \times \omega h/\omega i - (1 - P \times \omega/\omega i) \times U \qquad (1)$$

Assuming that the constant-speed motor 51 is a four-pole induction motor and the power source frequency is 60 Hz, the rotation rate $\omega i$ (rated rotation rate) of the constant-speed rotor 52 (constant-speed input shaft Ac) is 1,800 rpm. Further, when the variable-speed motor 71 is an eight-pole induction motor and the power supply frequency is 60 Hz, the maximum rotation rate $\omega h$ (rated rotation rate) of the variable-speed rotor 72 (variable-speed input shaft Av) is 900 rpm.

Further, the ratio U of the rotation rate $\omega S$ of the output shaft Ao to the rotation rate $\omega i$ of the constant-speed motor 51 (ratio Zi/ZS of the number of teeth ZS of the sun gear 11 to the number of teeth Zi of the internal gear 17) is set to 4.

Furthermore, the ratio P of the rotation rate $\omega c$ of the planetary gear carrier 21 to the rotation rate $\omega h$ of the variable-speed motor 71 is set to 0.3.

In this case, when the rotation direction of the constant-speed rotor 52 (internal gear 17) is the rotation in the second direction R2 (−1,800 rpm) and the rotation direction of the variable-speed rotor 72 (planetary gear carrier 21) has the maximum rotation rate in a direction opposite to the rotation of the constant-speed rotor 52 (rotation in the first direction R1) (900 rpm), the rotation rate $\omega S$ of the sun gear shaft 12 which is the output shaft Ao is 8,550 rpm. This rotation rate (8,550 rpm) is the maximum rotation rate of the sun gear shaft 12.

That is, in the transmission device 10 of the embodiment, the rotation rate ωS of the output shaft Ao becomes the maximum rotation rate when the internal gear 17 corresponding to the constant-speed input shaft Ac rotates at −1,800 rpm and the planetary gear carrier 21 corresponding to the variable-speed input shaft Av rotates at 900 rpm.

Assuming that a variable speed range of the variable-speed input shaft Av is from −900 rpm to +900 rpm, the rotation rate ωS of the output shaft Ao lowers as the rotation rate of the variable-speed input shaft Av approaches −900 rpm.

Figure 6:
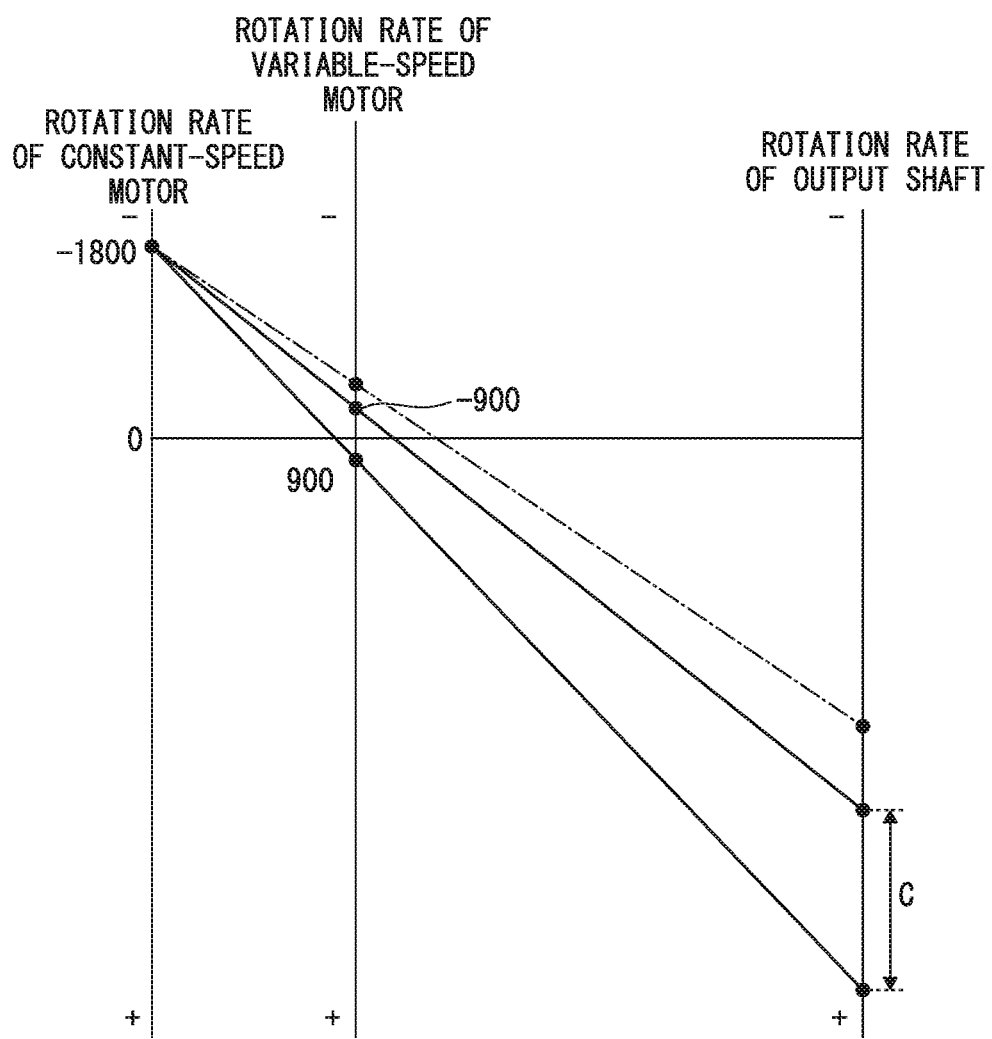
FIG. 6 is a collinear chart showing over-rotation of the variable-speed speed-up gear according to the embodiment of the present invention.

Next, the operation of the variable-speed speed-up gear 1 of the embodiment will be described with reference to a collinear chart shown in FIG. 6.

As the rotation rate of the constant-speed motor 51 is −1800 rpm and the rotation rate of the variable-speed motor changes in the range from −900 rpm to +900 rpm, the rotation rate of the output shaft Ao (compressor C) changes within a range indicated by a variable-speed range C.

In order not to over-rotate the rotation rate of the variable-speed motor 71 at the time of trip of the variable-speed motor 71, it is necessary to decelerate the rotation rate of the constant-speed motor 51 as quickly as possible, thereby decelerating the rotation rate of the output shaft Ao as slowly as possible.

As described above, since the moment of inertia of the constant-speed rotor 52 is much larger than the moment of inertia of the variable-speed rotor 72 or the output shaft Ao, the rotation rate is maintained when it is in the free running state. When the rotation rate of the output shaft Ao is decelerated faster from this state, the variable-speed motor 71 may be over-rotated (beyond a variable-speed range), as indicated by an alternate long and short dash line in FIG. 6.

Therefore, in order not to over-rotate the variable-speed motor 71 at the time of the trip of the variable-speed motor 71, it is necessary to decelerate the output shaft Ao as slowly as possible by increasing the moment of inertia of the rotating shaft of the output shaft Ao or the compressor C connected to the output shaft Ao.

Next, a method of stopping the variable-speed speed-up gear 1 according to the embodiment at the time of the trip of the electric driving device 50 will be described.

The controller 120 constantly monitors a state of the electric driving device 50.

The controller 120 of the variable-speed speed-up gear 1 of the embodiment trips the constant-speed motor 51 at the time of the trip of the variable-speed motor 71. Thereby, the constant-speed rotor 52 of the constant-speed motor 51 is in the free running state. Due to the trip of the constant-speed motor 51 and the variable-speed motor 71, the output shaft Ao is also in the free running state.

Here, since the flywheel 3 is installed on the output shaft Ao, the change in the rotation rate becomes gentle, and the time until the output shaft Ao stops becomes long.

According to the above-described method of stopping the variable-speed speed-up gear, the constant-speed rotor 52, the variable-speed rotor 72, the output shaft Ao rotate with momentum, the rotation rate gradually decreases, and thus the variable-speed speed-up gear 1 can be stopped.

According to the above-described embodiment, it is possible to prevent the variable-speed motor 71 from over-rotating at the time of the trip of the variable-speed motor 71.

That is, when the variable-speed motor 71 and the constant-speed motor 51 trip and the output shaft Ao in the free running state decelerates, the change in the rotation rate of the output shaft Ao becomes gentle by the flywheel 3 added to the output shaft Ao, and the time until the output shaft Ao stops becomes longer. Accordingly, it is possible to prevent over-rotation of the variable-speed motor 71 connected to the output shaft Ao via the transmission device 10 which is a planetary gear transmission device.

Further, it is possible to stably support the output shaft Ao equipped with the flywheel 3 which is an heavy object by providing the bearings disposed on both axial sides of the flywheel 3 in the vicinity of the flywheel 3.

Further, in the embodiment, the internal gear carrier shaft 37 which is a rod-shaped shaft is inserted through the variable-speed rotor shaft 73 which is a cylindrical shaft having the shaft insertion hole 74. That is, the constant-speed input shaft Ac having a large output is inserted through the variable-speed rotor shaft 73 of the variable-speed motor 71 having a smaller output than that of the constant-speed motor 51. Therefore, it is possible to adopt one having the constant-speed motor 51 having a larger output (horsepower).

Also, in the embodiment, the whole apparatus can be made more compact by disposing the constant-speed motor 51, the variable-speed motor 71, the transmission device, and the compressor C linearly in this order.

Also, in the embodiment, the configuration in which the flywheel 3 is installed on the output shaft Ao (the sun gear shaft 12) has been described, but the present invention is not limited thereto. When the flywheel 3 rotates in conjunction with the output shaft Ao, the installation position of the flywheel 3 is not limited. For example, the flywheel 3 may be installed on the rotating shaft of the compressor C. Further, the flywheel 3 may be a ring gear which meshes with a pinion provided coaxially with the output shaft Ao.

Further, the shape of the flywheel 3 is not limited to the shape shown in FIG. 2 or the like and may be, for example, a shape in which a thickness thereof in the axial direction gradually increases outward in the radial direction. Further, the flywheel 3 may be installed inside a casing of the compressor C.

Although the embodiments of the present invention have been described in detail, various modifications can be made without departing from the technical idea of the present invention.

For example, in the embodiment, a four-pole three-phase induction motor is exemplified as a constant-speed motor 51 suitable for rotating the compressor C at high speed, and an eight-pole three-phase induction motor is exemplified as a variable-speed motor 71 suitable for varying the rotation rate of the compressor C within a certain range. However, when it is unnecessary to rotate the driving target at high speed, other types of electric motors may be used as the constant-speed motor 51 and the variable-speed motor 71.

REFERENCE SIGNS LIST

1 Variable-speed speed-up gear
3 Flywheel
4 Bearing
10 Transmission device
11 Sun gear
12 Sun gear shaft
15 Planetary gear
17 Internal gear
21 Planetary gear carrier
22 Planetary gear shaft
27 Planetary gear carrier shaft 27*i* Input-side planetary gear carrier shaft
27*o* Output-side planetary gear carrier shaft
31 Internal gear carrier
37 Internal gear carrier shaft
41 Transmission casing
42 Sun gear bearing
50 Electric driving device
51 Constant-speed motor
52 Constant-speed rotor
53 Constant-speed rotor shaft
56 Conductive body
61 Constant-speed motor casing
66 Constant-speed stator
71 Variable-speed motor
72 Variable-speed rotor
73 Variable-speed rotor shaft
74 Shaft insertion hole
76 Conductive body
81 Variable-speed motor casing
86 Variable-speed stator
100 Rotation rate controller
101 Frequency conversion portion
102 Rotation direction switching portion
110 Power source line
111 Variable-speed motor switch
112 Constant-speed motor switch
120 Controller (control device)
121 Receiving portion
122 Interface
123 Calculating portion
Ac Constant-speed input shaft
Ao Output shaft
Ar Axis
Av Variable-speed input shaft
C Compressor

The invention claimed is:

1. A variable-speed speed-up gear comprising:
an electric driving device that generates a rotational driving force; and
a transmission device that changes the speed of the rotational driving force generated by the electric driving device and transmit the changed rotation driving force to a driving target,
wherein the transmission device comprises:
  a sun gear that rotates about an axis;
  a sun gear shaft which is fixed to the sun gear and extends in an axial direction around the axis;
  a planetary gear that meshes with the sun gear, revolve around the axis and rotate about its own center line;
  an internal gear which has a plurality of teeth aligned annularly around the axis and meshes with the planetary gear;
  a planetary gear carrier which has a planetary gear carrier shaft extending in the axial direction around the axis and supports the planetary gear to revolve around the axis and to be rotatable around a center line of the planetary gear itself; and
  an internal gear carrier which has an internal gear carrier shaft extending in the axial direction around the axis and supports the internal gear to be rotatable about the axis,
wherein the sun gear shaft acts as an output shaft connected to the driving target, the internal gear carrier shaft acts as a constant-speed input shaft, and the planetary gear carrier shaft acts as a variable-speed input shaft,
wherein the electric driving device includes a constant-speed motor having a constant-speed rotor that rotates the constant-speed input shaft of the transmission device, and a variable-speed motor having a variable-speed rotor which is configured to rotate the variable-speed input shaft of the transmission device,
wherein the variable-speed rotor and the planetary gear carrier shaft have a shaft insertion hole which is formed in a cylindrical shape around the axis and passes therethrough in the axial direction,
wherein the constant-speed rotor is inserted through the shaft insertion hole, and
wherein an inertia body is installed on the output shaft of the transmission device.

2. The variable-speed speed-up gear according to claim 1, further comprising a bearing disposed on both axial sides of the inertia body and in the vicinity of the inertia body.

3. The variable-speed speed-up gear according to claim 1, wherein the inertial body is a flywheel installed on the output shaft of the transmission device.

* * * * *